United States Patent
Jhang et al.

(10) Patent No.: US 10,306,138 B2
(45) Date of Patent: May 28, 2019

(54) IMAGE OUTPUT METHOD AND IMAGE CAPTURING DEVICE

(71) Applicant: ACER INCORPORATED, New Taipei (TW)

(72) Inventors: Jia-Ling Jhang, New Taipei (TW); Wei-Kuo Shih, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 15/603,430

(22) Filed: May 23, 2017

(65) Prior Publication Data

US 2018/0255239 A1    Sep. 6, 2018

(30) Foreign Application Priority Data

Mar. 3, 2017    (TW) .............................. 106106926 A

(51) Int. Cl.
| | |
|---|---|
| *H04N 5/232* | (2006.01) |
| *H04N 5/235* | (2006.01) |
| *H04N 9/73* | (2006.01) |
| *G06T 7/00* | (2017.01) |
| *G06F 21/83* | (2013.01) |
| *G06F 21/62* | (2013.01) |

(52) U.S. Cl.
CPC ....... *H04N 5/23229* (2013.01); *G06F 21/629* (2013.01); *G06F 21/83* (2013.01); *G06T 7/97* (2017.01); *H04N 5/232* (2013.01); *H04N 5/2351* (2013.01); *H04N 9/735* (2013.01); *G06F 2221/031* (2013.01); *G06T 2207/20224* (2013.01)

(58) Field of Classification Search
CPC ................ G06K 9/6262; G06K 9/4671; G06F 17/30244–3028; G06T 7/30–38; G06T 3/0068–0081; G06T 7/20–292; H04N 5/2356
USPC ....... 348/143, 373, 345, 175, 129, 130, 131, 348/134; 600/109; 396/153; 382/255; 359/696, 698
See application file for complete search history.

(56) References Cited

U.S. PATENT DOCUMENTS

| | | | |
|---|---|---|---|
| 6,930,703 B1 | 8/2005 | Hubel | |
| 8,421,871 B2 * | 4/2013 | Onoe | .................... G06T 3/0087 |
| | | | 348/218.1 |
| 2004/0155957 A1* | 8/2004 | Kobayashi | ......... A61B 1/00009 |
| | | | 348/68 |
| 2008/0177136 A1 | 7/2008 | Wang | |

(Continued)

FOREIGN PATENT DOCUMENTS

| | | |
|---|---|---|
| JP | 2008-311775 A | 12/2008 |
| TW | 201014730 | 4/2010 |

(Continued)

*Primary Examiner* — Xi Wang
(74) *Attorney, Agent, or Firm* — Winston Hsu

(57) ABSTRACT

An image output method for an image capturing device includes capturing a first test image at a first time point and a second test image at a second time point, calculating a first image feature value of the first test image and a second image feature value of the second test image, and determining whether to output images generated by the image capturing device according to the first image feature value of the first test image and the second image feature value of the second test image.

4 Claims, 5 Drawing Sheets

(56) References Cited

U.S. PATENT DOCUMENTS

| | | | | |
|---|---|---|---|---|
| 2009/0171148 A1* | 7/2009 | Lu | ............... | A61B 1/00036 |
| | | | | 600/109 |
| 2012/0113279 A1* | 5/2012 | Park | ............... | H04N 5/232 |
| | | | | 348/208.6 |
| 2016/0026900 A1* | 1/2016 | Ando | ............... | G06K 9/4642 |
| | | | | 382/159 |
| 2017/0024619 A1* | 1/2017 | Wu | ............... | G06K 9/00812 |

FOREIGN PATENT DOCUMENTS

| | | |
|---|---|---|
| TW | 201223263 A1 | 6/2012 |
| TW | 201643777 A | 12/2016 |

\* cited by examiner

IMAGE OUTPUT METHOD AND IMAGE CAPTURING DEVICE

BACKGROUND OF THE INVENTION

1. Field of the Invention

The present invention relates to an image output method and an image capturing device, and more particularly, to an image output method and an image capturing device capable of improving the security of image data.

2. Description of the Prior Art

With the development of technology and progress of industry, digital cameras have been widely utilized in all kinds of electronic devices, such as laptops, tablets, desktops, mobile phones, wearable devices, smart TVs and so on. Since the electronic devices have ability to connect to the Internet, users utilize the digital cameras mounted on the electronic devices to take photos and share the photos to other electronic devices via the Internet. However, the electronic devices with the ability to connect to the Internet are easy to be invaded by hackers via remote control, so as to manipulate the cameras, peep or steal the images taken by the camera, thus threatening the privacy and security of the users. Therefore, there is a need for improvement.

SUMMARY OF THE INVENTION

Therefore, the present invention primarily provides an image output method and an image capturing device, which is capable of improving the security of image data to solve the above mentioned problems.

The present invention discloses an image output method for an image capturing device comprising capturing a first test image at a first time point and a second test image at a second time point; calculating a first image feature value of the first test image and a second image feature value of the second test image; and determining whether to output images generated by the image capturing device according to the first image feature value of the first test image and the second image feature value of the second test image.

The present invention further discloses an image capturing device, comprising an image sensing unit, for capturing a first test image at a first time point and capturing a second test image at a second time point; a determination unit, for calculating a first image feature value of the first test image and a second image feature value of the second test image, and determining whether to output images generated by the image capturing device according to the first image feature value of the first test image and the second image feature value of the second test image to generate a determination result; and an output unit, for outputting the images generated by the image capturing device according to the determination result.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
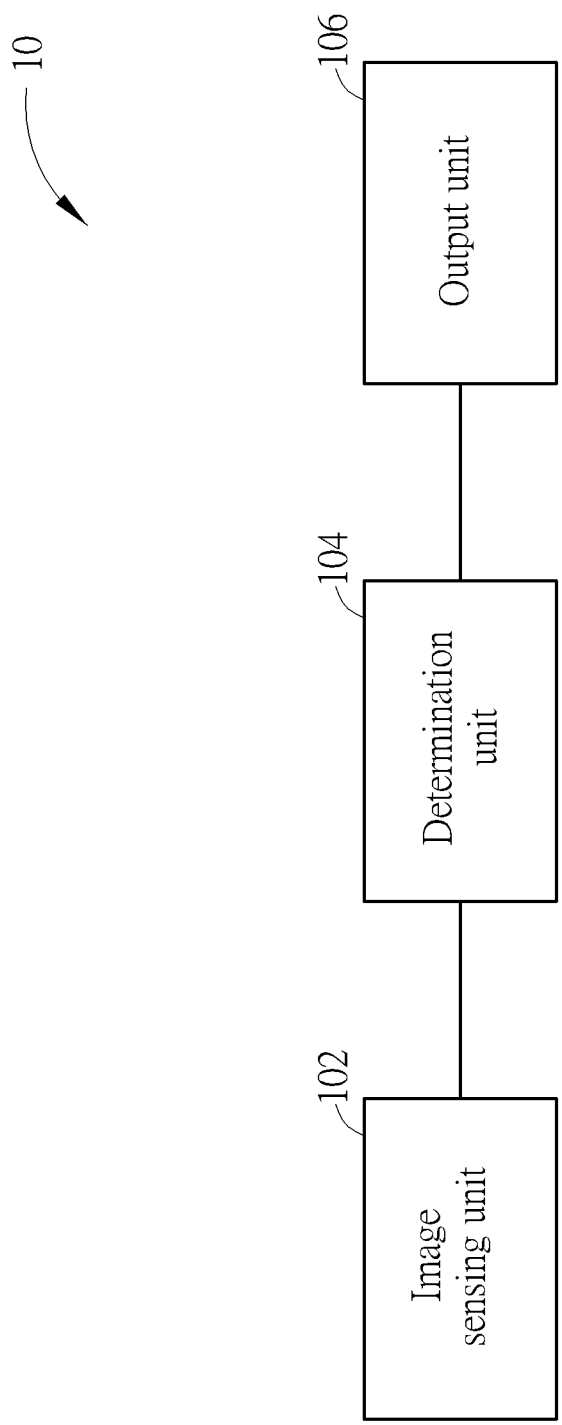
FIG. 1 is a schematic diagram illustrating an image capturing device according to an embodiment of the present invention.

Please refer to FIG. 1, which is a schematic diagram illustrating an image capturing device 10 according to an embodiment of the present invention. The image capturing device 10 can be utilized in all kinds of electronic devices, such as notebooks, tablets, desktops, mobile phones, wearable devices, smart TVs, but not limited thereto. The image capturing device 10 includes an image sensing unit 102, a determination unit 104 and an output unit 106.

The image sensing unit 102 is utilized for capturing images. The image sensing unit 102 can be a charge-coupled device (CCD) sensor, a complementary metal oxide semiconductor (CMOS) sensor, or other image sensors. The image captured by the image sensing unit 102 can be raw images. The image captured by the image sensing unit 102 can be outputted directly to other external devices. The image captured by the image sensing unit 102 can also be provided to an image signal processor (ISP) of the image capturing device 10, such that the image signal processor handles corresponding image processing procedure of the captured image and outputs for consequent application. For example, image processing procedure executed by the image signal processor can be image format transformation, auto white balance (AWB), auto exposure (AE), auto focus (AF), contrast adjustment, saturation adjustment, noise elimination, interpolation, edge enhancement and the like, but not limited thereto. The image sensing unit 102 can capture images consecutively. For example, the image sensing unit 102 captures test images in a test mode and captures relative images in a normal mode. In the test mode, the image sensing unit 102 captures a first test image at a first time point and a second test image at a second time point.

The determination unit 104 is used for calculating a first image feature value of a first test image and a second image feature value of a second test image. And the determination unit 104 determines whether to output images generated by the image capturing device 10 according to the first image feature value of the first test image and the second image feature value of the second test image, and accordingly generates a determination result. The output unit 106 outputs the images generated by the image capturing device 10 according to the determination result generated by the determination unit 104. In an embodiment, at least one of the determination unit 104 and the output unit 106 can be implemented by an image signal processor.

In brief, the image capturing device 10 of the present invention can determine whether to output the images generated by the image capturing device 10 according to image feature values of the captured images at different time points. That is, after determination and authentication of the determination unit 104 and the output unit 106, the images generated by the image capturing device 10 can be outputted, so as to provide a security control procedure of image data access. As such, the invention can effectively prevent hackers from stealing or peeping the images generated by the image capturing device 10 via remote control, and therefore, improving security of image data.

Figure 2:
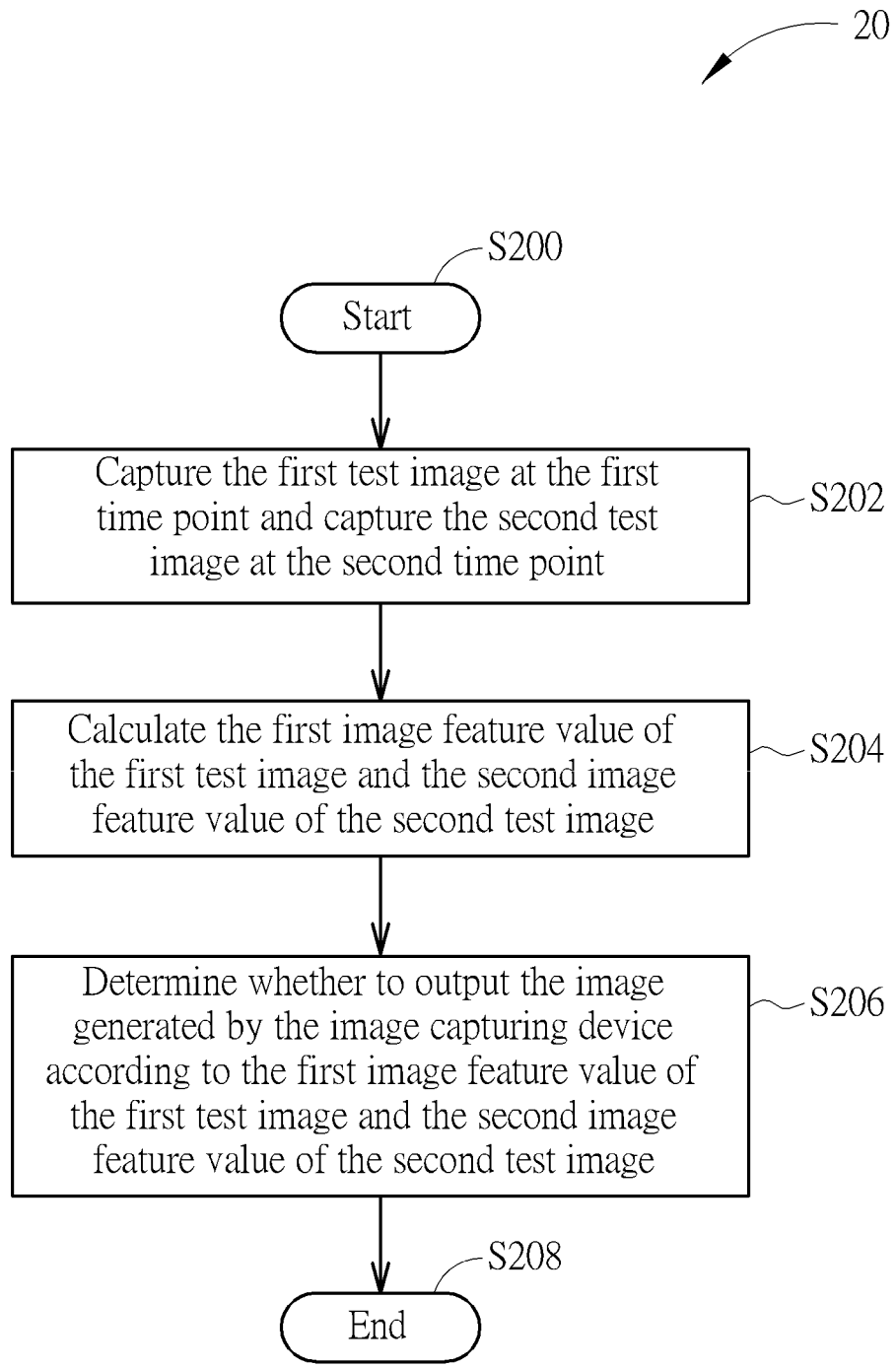
FIG. 2 is a schematic diagram illustrating a procedure according to an embodiment of the present invention.

For an illustration of the operations of the image capturing device 10, please refer to FIG. 2, which is a schematic diagram illustrating a procedure 20 according to an embodiment of the present invention. The procedure 20 includes the following steps:

Step S200: Start.

Step S202: Capture the first test image at the first time point and capture the second test image at the second time point.

Step S204: Calculate the first image feature value of the first test image and the second image feature value of the second test image.

Step S206: Determine whether to output the image generated by the image capturing device according to the first image feature value of the first test image and the second image feature value of the second test image.

Step S208: End.

According to the procedure 20, the present invention can control whether to output the images based on the images captured by the image sensing unit 102 for improving the security of the image data. When the image capturing device 10 receives image access requests or before the image capturing device 10 is ready to output the images, first, in Step S202, the image capturing device 10 enters a test mode, and the image sensing unit 102 captures a first test image at a first time point and captures a second test image at a second time point. For example, the second time point is after the first time point. A time interval between the first time point and the second time point can be determined according to system requirements. For example, the time interval between the first time point and the second time point is 30 microseconds (ms). For another example, the time interval between the first time point and the second time point is 5 seconds(s).

In Step S204, the determination unit 104 calculates a first image feature value of the first test image and a second image feature value of the second test image. For example, the first image feature value of the first test image can be a brightness value, a color value, a focal distance (focal length) or any other image feature values associated with the first test image. The second image feature value of the second test image can be a brightness value, a color value, a focal distance or any other image feature values associated with the second test image.

In Step S206, the determination unit 104 determines whether to output the images generated by the image capturing device 10 according to the first image feature value of the first test image and the second image feature value of the second test image, and accordingly generates a determination result. The determination unit 104 can calculate an image difference value between the first image feature value and the second image feature value. For instance, the determination unit 104 can subtract the second image feature value from the first image feature value to calculate a difference value between the first image feature value and the second image feature value. As such, the calculated difference value is the image difference value between the first image feature value and the second image feature value. For another example, the determination unit 104 can calculate an absolute difference between the first image feature value and the second image feature value, and the absolute difference is the image difference value between the first image feature value and the second image feature value. As such, the image difference value represents a variation between the first test image at the first time point and the second test image at the second time point. Then, the determination unit 104 compares the image difference value with a threshold and generates the determination result accordingly. For example, when the image difference value is greater than the threshold, the determination result indicates to output the images generated by the image capturing device 10. When the image difference value is equal to or smaller than the threshold, the determination result indicates not to output the images generated by the image capturing device 10.

Furthermore, the output unit 106 outputs the images generated by the image capturing device 10 according to the determination result determined by the determination unit 104. In an embodiment, when the determination result indicates to output the images generated by the image capturing device 10, the output unit 106 outputs the images generated by the image capturing device 10 to other external devices or other devices, wherein the images generated by the image capturing device 10 includes at least one of test images captured by the image sensing unit 102 in the test mode, images captured by the image sensing unit 102 in the normal mode, images processed by the image processor. In other words, the output unit 106 can output the test images captured by the image sensing unit 102 of the image capturing device 10 in the test mode and/or output the images captured by the image sensing unit 102 of the image capturing device 10 in the normal mode. Or, the output unit 106 can output the images processed by the image processor of the image capturing device 10. Therefore, after the determination and authentication procedure of the procedure 20, if the determination result indicates to output the images generated by the image capturing device 10, the image capturing device 10 performs image output procedure normally.

In an embodiment, when the determination result indicates not to output the images generated by the image capturing device 10, the output unit 106 will not perform any operation. In such a situation, the images generated by the image capturing device 10 will not be outputted and provided to other devices. For example, when the determination result indicates not to output the images generated by the image capturing device 10, the output unit 106 can output (or control a display device to display) a monochrome image, for instance, a black image or a white image, to indicate not allowable to access the images generated by the image capturing device 10. That is, in this situation, if the determination result indicates not to output the images generated by the image capturing device 10, the image capturing device 10 will not be allowed to perform the image output procedure normally.

On the other hand, after the determination unit 104 generates the corresponding determination result, the image capturing device 10 can inform a user whether the images generated by the image capturing device 10 can be outputted (or not) by an alarming unit (not illustrated in the figure). For example, the alarming unit can generate alarm signals (via all kinds of ways, e.g., words, voices, lights or vibration) to inform the user.

Figure 3:
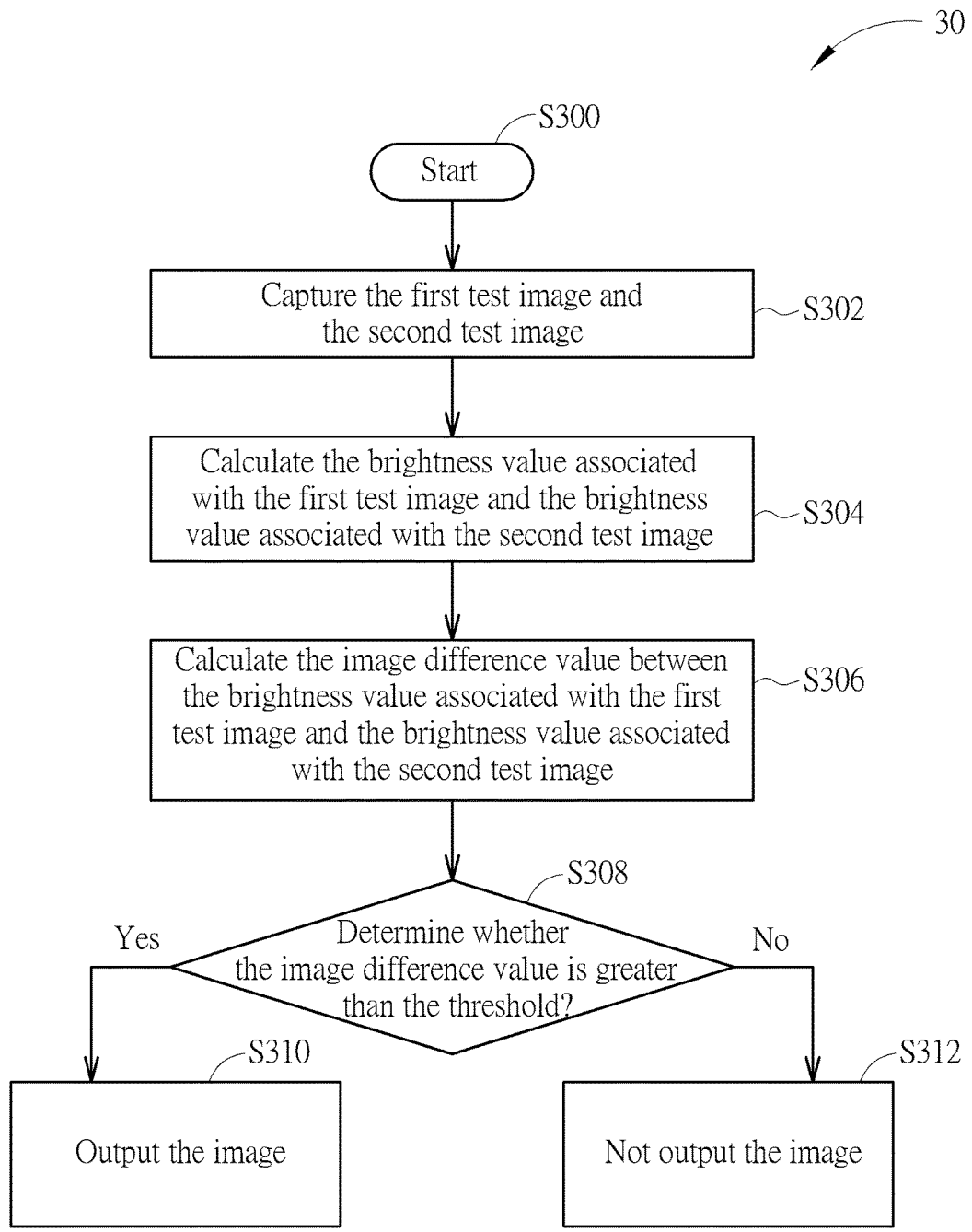
FIGS. 3-5 are schematic diagrams illustrating different procedures according to alternative embodiments of the present invention.

Please refer to FIG. 3, which is a schematic diagram illustrating a procedure 30 according to an embodiment of the present invention. The procedure 30 includes the following steps:

Step S300: Start.

Step S302: Capture the first test image and the second test image.

Step S304: Calculate the brightness value associated with the first test image and the brightness value associated with the second test image.

Step S306: Calculate the image difference value between the brightness value associated with the first test image and the brightness value associated with the second test image.

Step S308: Determine whether the image difference value is greater than the threshold; if yes, perform the Step S310; if no, perform the Step S312.

Step S310: Output the image.

Step S312: Not output the image.

According to the procedure 30, in Step S302, when the image capturing device 10 receives image access requests or before the image capturing device 10 is ready to output the images, the image capturing device 10 enters a test mode, and the image sensing unit 102 captures a first test image at a first time point and captures a second test image at a second time point.

In Step S304, the determination unit 104 calculates the brightness value associated with the first test image and the brightness value associated with the second test image. The pixel brightness value of the first test image can be an average brightness value of pixels of at least a portion of the first test image. The brightness value of the second test image can be an average brightness value of pixels of at least a portion of the second test image. In detail, the determination unit 104 respectively detects the pixel brightness value of each pixel of at least a portion of the first test image, and calculates an average of brightness values of all pixels of the at least a portion of the first test image, and the calculated result is the brightness value associated with the first test image. Similarly, for the second test image, the determination unit 104 respectively detects the pixel brightness value of each pixel of at least a portion of the second test image and calculates an average of brightness values of all pixels of at least a portion of the second test image, and the calculated result is the brightness value associated with the second test image.

For example, assume that a first region of the images captured by the image sensing unit 102 usually corresponds to a head region of the user when using the image capturing device 10. The determination unit 104 can respectively detect the pixel brightness value of each pixel of the first region of the first test image and the second test image. And then, the determination unit 104 calculates the average pixel brightness value of all pixels of the first region of the first test image to obtain the brightness value associated with the first test image, and calculates the average pixel brightness value of all pixels of the second region of the second test image to obtain the brightness value associated with the second test image.

For example, calculation of the whole region of the image is also available. The determination unit 104 can respectively detect the brightness value of each pixel of the first test image and the second test image. After that, the determination unit 104 calculates an average of brightness values of all pixels of the first test image to obtain the brightness value associated with the first test image, i.e. taking the calculated average value as the brightness value associated with the first test image. The determination unit 104 calculates an average of brightness values of all pixels of the second test image to obtain the brightness value associated with the second test image, i.e. taking the calculated average value as the brightness value associated with the second test image.

In Step S306, the determination unit 104 calculates an image difference value between the brightness value associated with the first test image and the brightness value associated with the second test image. For example, the determination unit 104 can subtract the brightness value associated with the second test image from the brightness value associated with the first test image, so as to calculate a difference between the brightness value associated with the first test image and the brightness value associated with the second test image. In this situation, the calculated result is the image difference value between the brightness value associated with the first test image and the brightness value associated with the second test image. The calculated image difference value can show a variation between the first test image and the second test image. For example, the determination unit 104 can calculate an absolute difference between the brightness value associated with the first test image and the brightness value associated with the second test image, and the calculated result is the image difference value between the brightness value associated with the first test image and the brightness value associated with the second test image.

Since an object remains stationary in the images, neighboring frames usually do not exhibit any significant variation, so that the image difference value is usually small. When the object is moving in the images, the image difference value will be larger. Moreover, the user's body usually moves slightly or slenderly and is not completely stationary when the user is in shooting range of the image capturing device 10. Therefore, in Step S308, the determination unit 104 can compare the image difference value calculated in Step S306 with a threshold to generate a determination result. For example, when the image difference value is greater than the threshold, this means that the user is in the shooting range of the image capturing device 10 and the user is using the image capturing device 10. As a result, the determination result indicates to output the images generated by the image capturing device 10. The output unit 106 accordingly outputs the images generated by the image capturing device 10 (Step S310). On the other hand, when the image difference value is smaller than or equal to the threshold, this means that the user is not in the shooting range of the image capturing device 10. As such, the determination result indicates not to output the images generated by the image capturing device 10. The output unit 106 will not output any image generated by the image capturing device 10, or the output unit 106 controls a display device to display a black image (Step S312). In other words, the present invention can determine whether to output the images generated by the image capturing device 10 according to the variation of brightness of the images, and effectively improve the security of image data access.

Besides, in an embodiment, the relative operations performed by the determination unit 104 in steps S304, S306 and S308, can also be implemented by an auto exposure module of an image signal processor.

Figure 4:
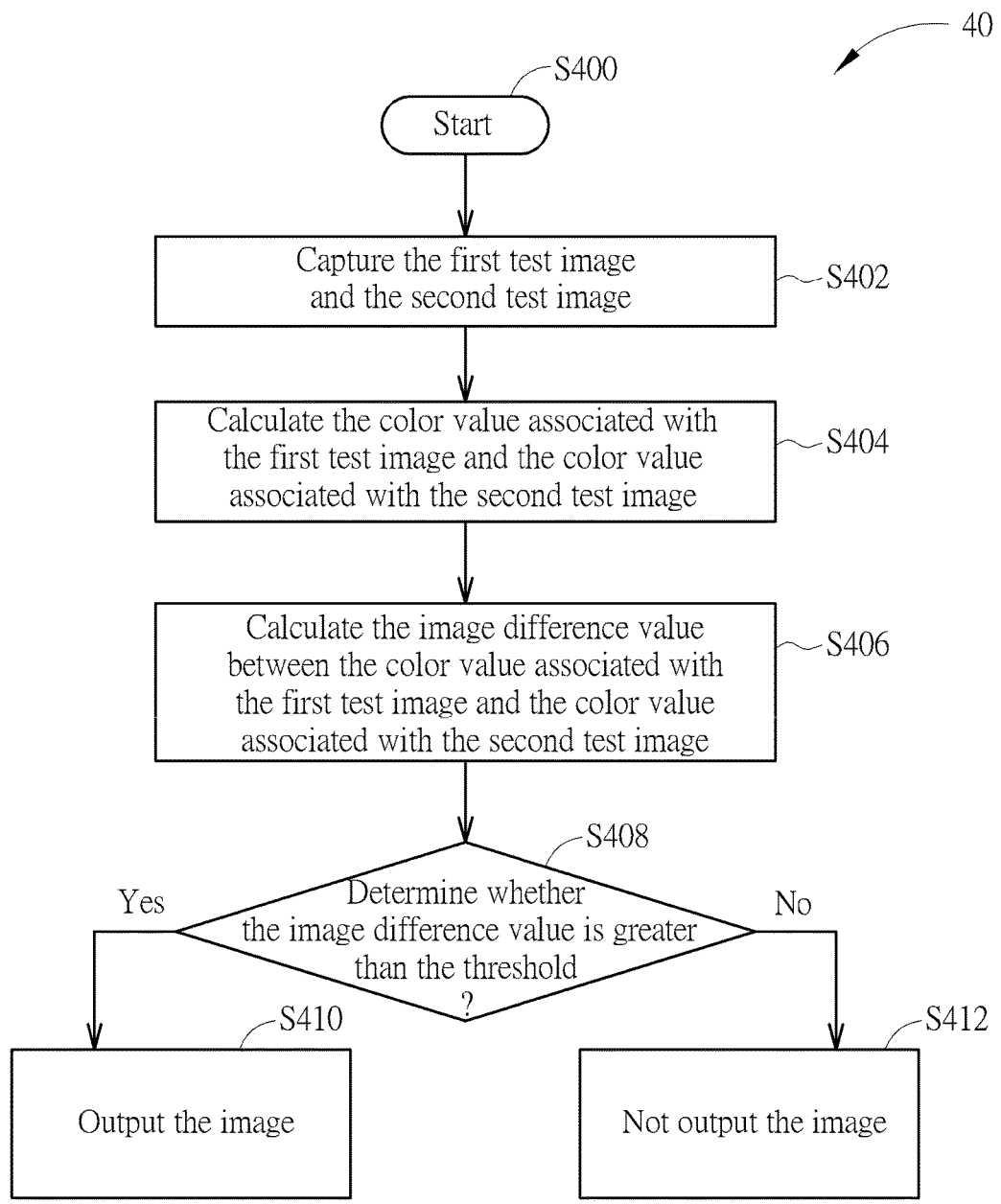

Please refer to FIG. 4, which is a schematic diagram of a procedure 40 according to another embodiment of the present invention. The procedure 40 includes the following steps:

Step S400: Start.

Step S402: Capture the first test image and the second test image.

Step S404: Calculate the color value associated with the first test image and the color value associated with the second test image.

Step S406: Calculate the image difference value between the color value associated with the first test image and the color value associated with the second test image.

Step S408: Determine whether the image difference value is greater than the threshold; if yes, perform Step S410; if no, perform Step S412.

Step S410: Output the image.

Step S412: Not output the image.

According to the procedure 40, in Step S402, when the image capturing device 10 receives image access requests or before the image capturing device 10 is ready to output the images. The image capturing device 10 enters a test mode, and the image sensing unit 102 captures a first test image at a first time point and captures a second test image at a second time point.

In Step S404, the determination unit 104 calculates the color value associated with the first test image and the color value associated with the second test image. The color value of the first test image can be an average of color values of pixels of at least a portion of the first test image. The color value of the second test image can be an average of color values of pixels of at least a portion of the second test image. The color value can be at least a color component value of three-primary colors or component value of other colors. In detail, the determination unit 104 respectively detects the color value of each pixel of at least a portion of the first test image, and calculates the average of color values of all pixels of the at least a portion of the first test image, so that the calculated result is the color value associated with the first test image. Similarly, for the second test image, the determination unit 104 respectively detects the pixel color value of each pixel of at least a portion of the second test image, and calculates the average of color values of all pixels of the at least a portion of the second test image, so that the calculated result is the color value associated with the second test image.

For example, calculation of blue component value of the whole region of the image is also available. The determination unit 104 can respectively detect blue component value of each pixel of the first test image and the second test image. After that, the determination unit 104 calculates the average of blue component values of all pixels of the first test image to obtain the color value associated with the first test image, i.e. taking the calculated average value as the color value associated with the first test image. The determination unit 104 calculates the average of blue component values of all pixels of the second test image to obtain the color value associated with the second test image, i.e. taking the calculated average value as the color value associated with the second test image.

In Step S406, the determination unit 104 calculates an image difference value between the color value associated with the first test image and the color value associated with the second test image. For example, the determination unit 104 can calculate a difference or an absolute difference between the color value associated with the first test image and the color value associated with the second test image. In this situation, the calculated result is the image difference value between the color value associated with the first test image and the color value associated with the second test image. The calculated image difference value can show a color variation between the first test image and the second test image.

Therefore, in Step S408, the determination unit 104 can compare the image difference value calculated in Step S406 with a threshold to generate a determination result. For example, assume that the blue component value is taken as a calculation basis in Step S404. When the image difference value is greater than the threshold, this means that a blue or similar color object is approaching the shooting range of the image capturing device 10. As such, the determination result indicates to output the images generated by the image capturing device 10. The output unit 106 accordingly outputs the images generated by the image capturing device 10 (Step S410). On the other hand, when the image difference value is smaller than or equal to the threshold, this means that no blue or similar color object is approaching the shooting range of the image capturing device 10. As such, the determination result indicates not to output the images generated by the image capturing device 10. The output unit 106 will not output any image generated by the image capturing device 10, or the output unit 106 controls a display device to display a black image (Step S412). That is, the present invention can take colors as a key of image output control. For example, when the blue component value is used as the calculation basis and the user takes a blue card in front of lens of the image sensing unit 102, the output unit 106 will output the images captured by the image capturing device 10 after performing the steps of the procedure 40. In other words, the present invention can determine whether to output the images generated by the image capturing device 10 according to the variation of the color value of the images, and effectively improve the security of image data access.

In an embodiment, relative operations performed by the determination unit 104 in steps S406, S406 and Step S408 can also be implemented by an auto white balance module of an image signal processor.

Figure 5:
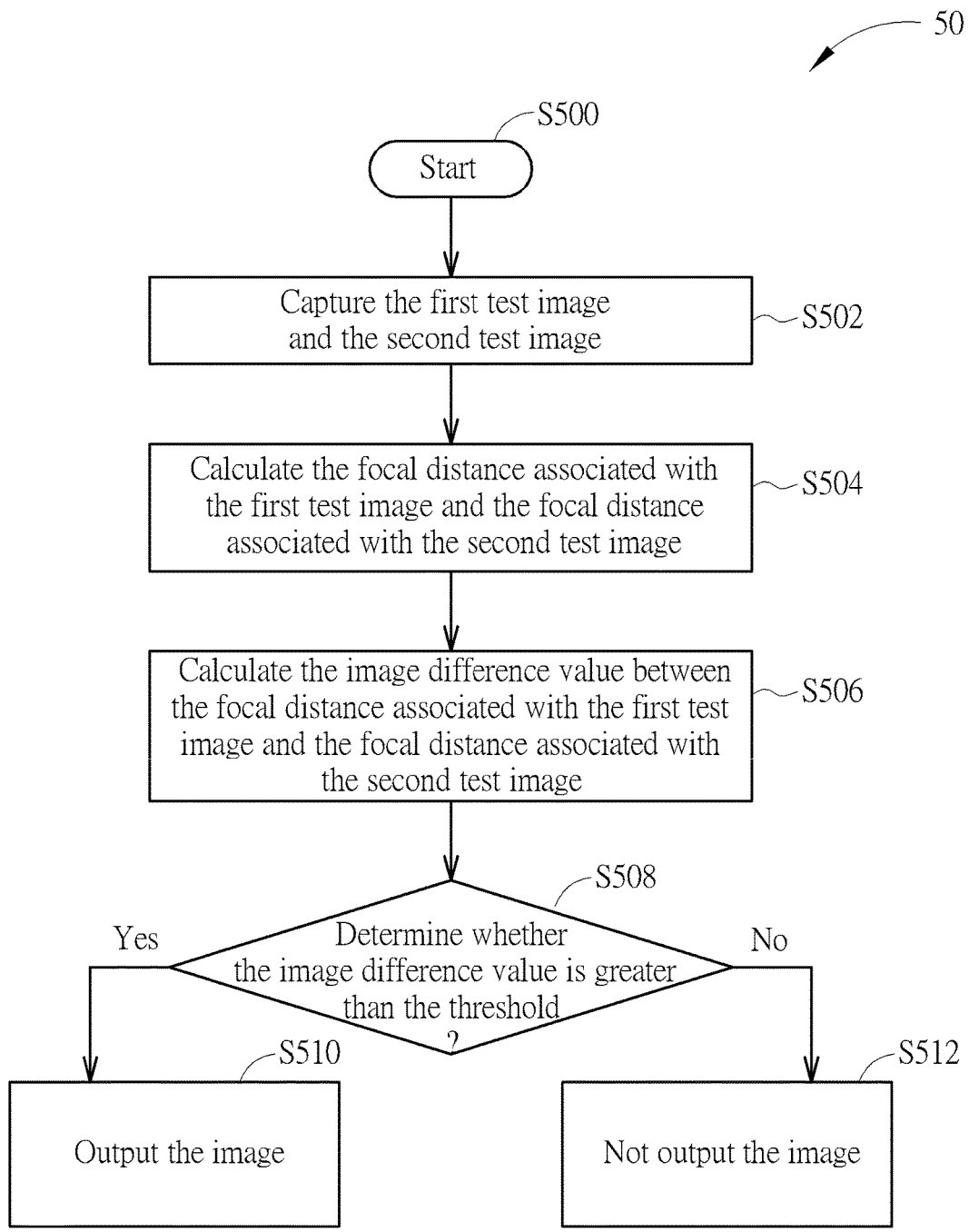

Please refer to FIG. 5, which is a schematic diagram of a procedure 50 according to another embodiment of the present invention. The procedure 50 includes the following steps:

Step S500: Start.

Step S502: Capture the first test image and the second test image.

Step S504: Calculate the focal distance associated with the first test image and the focal distance associated with the second test image.

Step S506: Calculate the image difference value between the focal distance associated with the first test image and the focal distance associated with the second test image.

Step S508: Determine whether the image difference value is greater than the threshold; if yes, perform Step S510; if no, perform Step S512.

Step S510: Output the image.

Step S512: Not output the image.

According to the procedure 50, in Step S502, when the image capturing device 10 receives image access requests or before the image capturing device 10 is ready to output the images. The image capturing device 10 enters a test mode, and the image sensing unit 102 captures a first test image at a first time point and captures a second test image at a second time point.

In Step S504, the determination unit 104 calculates the focal distance associated with the first test image and the focal distance associated with the second test image. The focal distance of the first test image can be the focal distance of at least a portion of the first test image. The focal distance of the second test image can be the focal distance of at least a portion of the second test image. For example, assume that a first region of the images captured by the image sensing unit 102 is taken as a focal distance evaluation region. The determination unit 104 respectively calculates a first focal distance corresponding to the first region of the first test image and a second focal distance corresponding to the first region of the second test image. For example, assume that the whole region of the images captured by the image sensing unit 102 can be taken as the focal distance evaluation region. The determination unit 104 can respectively calculate the first focal distance corresponding to the first test image and the second focal distance corresponding to the second test image.

In Step S506, the determination unit 104 calculates an image difference value between the first focal distance associated with the first test image and the second focal distance associated with the second test image. For example, the determination unit 104 can calculate a difference between the first focal distance associated with the first test image and the second focal distance associated with the second test image. In this situation, the calculated result is the image difference value between the first focal distance associated with the first test image and the second focal distance associated with the second test image. The calculated image difference value can show a variation of an object's movement in the first test image and the second test image. For example, the determination unit 104 can calculate the absolute difference between the first focal distance associated with the first test image and the second focal distance associated with the second test image, and the calculated result is the image difference value between the focal distance associated with the first test image and the focal distance associated with the second test image.

In Step S508, the determination unit 104 can compare the image difference value calculated in Step S506 with a threshold to generate a determination result. For example, when the image difference value is greater than the threshold, this means that a user is moving, so that the determination result indicates to output the images generated by the image capturing device 10. The output unit 106 accordingly outputs the images generated by the image capturing device 10 (Step S510). On the other hand, when the image difference value is smaller than or equal to the threshold, this means that no user exists, so that the determination result indicates not to output the images generated by the image capturing device 10. And the output unit 106 will not output any image generated by the image capturing device 10 (Step S512). In other words, by the above mentioned method, the invention can automatically recognize whether the object is moving in the image, and allow image output when detecting movement variation of the object. That is, the present invention can determine whether to output the images generated by the image capturing device 10 according to the focal distance variation of the images, and effectively improve the security of image data access.

Besides, in an embodiment, relative operations performed by the determination unit 104 in steps S506, S506 and S508 can also be implemented by an auto focus balance module of an image signal processor.

In summary, in the traditional method, the captured images are directly transmitted to the display device or the external device for preview or storage after capturing images. In comparison, the image capturing device 10 of the present invention can determine whether to output the images captured by the image capturing device 10 according to the image feature values of the captured images at different time points. That is, the images generated by the image capturing device 10 of the present invention can be outputted only after determination and authentication. As such, the present invention can effectively prevent hackers from stealing or peeping the images generated by the image capturing device 10 via remote control and thus enhancing the security of image data access.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image output method for an image capturing device comprising:
    capturing a first test image at a first time point and a second test image at a second time point in a test mode;
    calculating a first image feature value of the first test image and a second image feature value of the second test image; and
    determining whether to output images generated by the image capturing device in a normal mode according to the first image feature value of the first test image and the second image feature value of the second test image, comprising:
        calculating a difference value between the first image feature value and the second image feature value, wherein the first image feature value of the first test image is associated with a color value of the first test image and the second image feature value of the second test image is associated with a color value of the second test image; and
        comparing the difference value with a threshold value and outputting the images generated by the image capturing device in the normal mode when the difference value is greater than the threshold value.

2. The image output method of claim 1, wherein the difference value is an absolute difference between the first image feature value and the second image feature value.

3. An image output method for an image capturing device comprising:
    capturing a first test image at a first time point and a second test image at a second time point in a test mode;
    calculating a first image feature value of the first test image and a second image feature value of the second test image; and
    determining whether to output images generated by the image capturing device in a normal mode according to the first image feature value of the first test image and the second image feature value of the second test image, comprising:
        calculating a difference value between the first image feature value and the second image feature value, wherein the first image feature value of the first test image is associated with a brightness value of the first test image and the second image feature value of the second test image is associated with a brightness value of the second test image; and
        comparing the difference value with a threshold value and outputting the images generated by the image capturing device in the normal mode when the difference value is greater than the threshold value.

4. An image output method for an image capturing device comprising:
    capturing a first test image at a first time point and a second test image at a second time point in a test mode;
    calculating a first image feature value of the first test image and a second image feature value of the second test image; and
    determining whether to output images generated by the image capturing device in a normal mode according to the first image feature value of the first test image and the second image feature value of the second test image, comprising:
        calculating a difference value between the first image feature value and the second image feature value, wherein the first image feature value of the first test image is associated with a focal distance of the first test image and the second image feature value of the second test image is associated with a focal distance of the second test image; and comparing the difference value with a threshold value and outputting the images generated by the image capturing device in the normal mode when the difference value is greater than the threshold value.

* * * * *